United States Patent [19]

Smiley

[11] 4,119,121
[45] Oct. 10, 1978

[54] PROTECTIVE CLOSURE FOR INTERNAL PIPE THREADS

[75] Inventor: Kenneth A. Smiley, Eldred, Pa.

[73] Assignee: Pennsylvania Plastic Products, Inc., Eldred, Pa.

[21] Appl. No.: 849,333

[22] Filed: Nov. 7, 1977

Related U.S. Application Data

[63] Continuation of Ser. No. 694,535, Jun. 10, 1976, abandoned.

[51] Int. Cl.² .............................................. B65D 59/06
[52] U.S. Cl. ..................................................... 138/96 T
[58] Field of Search .................. 138/96 R, 96 T, 285; 285/DIG. 2

[56] References Cited

UNITED STATES PATENTS DOCUMENTS

| | | | |
|---|---|---|---|
| 1,590,517 | 6/1926 | Jacobs | 138/96 T |
| 1,786,467 | 12/1930 | Walter | 138/96 T |
| 1,788,253 | 1/1931 | Shrum | 138/96 T |
| 1,853,946 | 4/1932 | Unke | 138/96 T |
| 2,238,643 | 4/1941 | Hicks | 138/96 T |
| 2,893,437 | 7/1959 | Rickard | 138/96 T |
| 2,893,438 | 7/1959 | Rickard | 138/96 T |
| 3,606,073 | 9/1971 | Burke | 138/96 T |

Primary Examiner—Charles E. Phillips
Attorney, Agent, or Firm—Cumpston & Shaw

[57] ABSTRACT

A plastic closure securely insertable into the end of a pipe, pipe coupling secured to the end of a pipe, tubing, casing or the like for protecting the internal threads from damage. The closure comprises a tapered sleeve having a pair of axially spaced, outer peripheral thread portions. One thread portion is adapted to tightly secure the closure to a pipe coupling having internal threads of the Buttress type in which the threads extend to the end of the coupling. The other thread portion is adapted to tightly secure the closure to a pipe coupling having internal threads of the API type in which the threads do not extend to the end of the coupling. In the latter type thread, the section of the pipe coupling between the ends of the threads and coupling is tapered or flared outwardly.

8 Claims, 7 Drawing Figures

U.S. Patent     Oct. 10, 1978     4,119,121
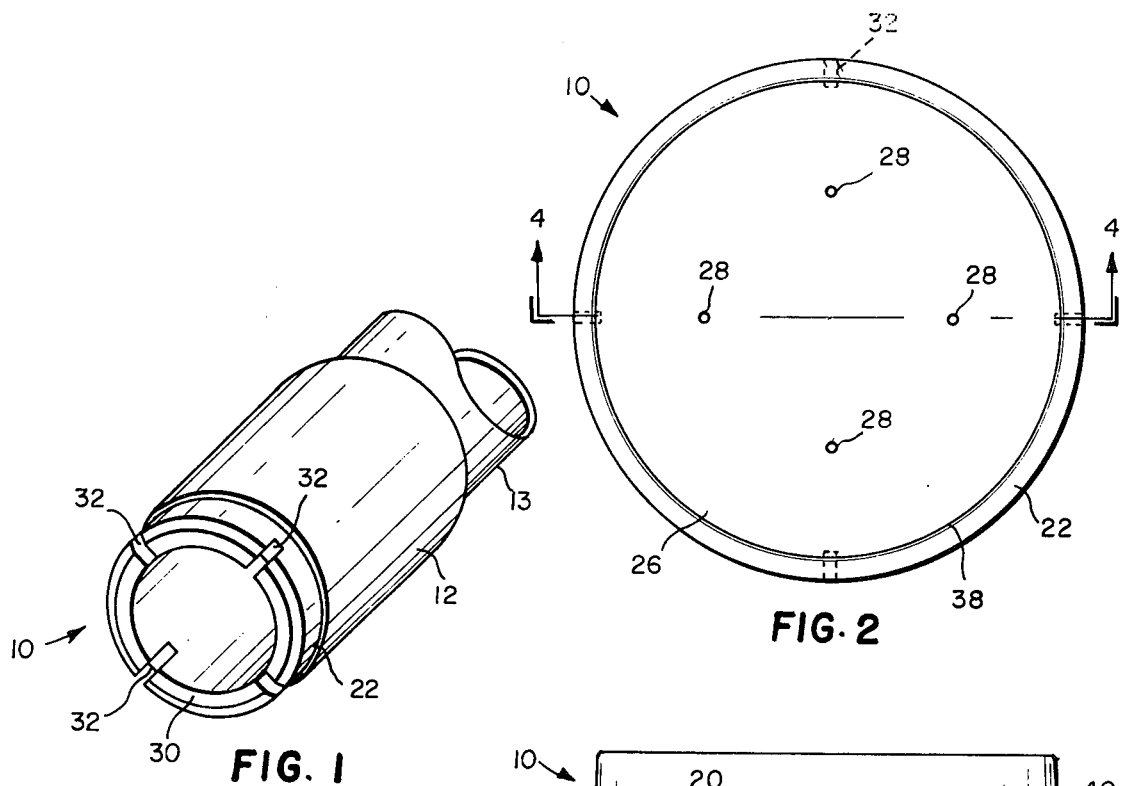
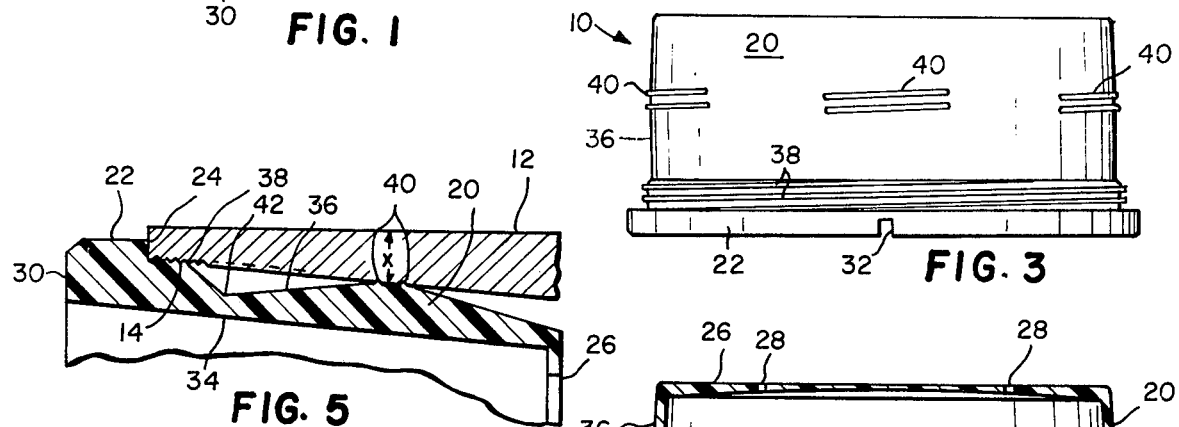
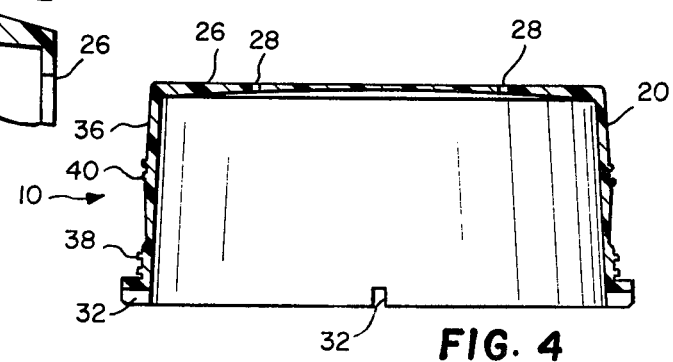
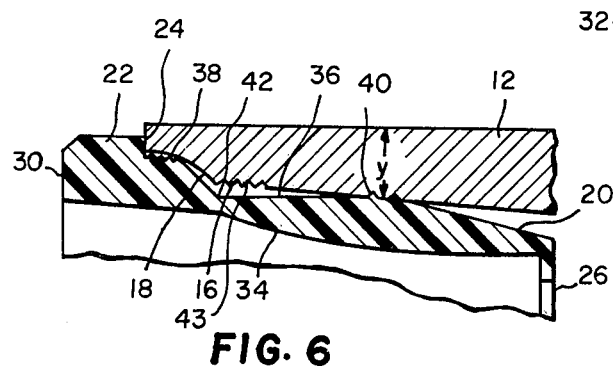
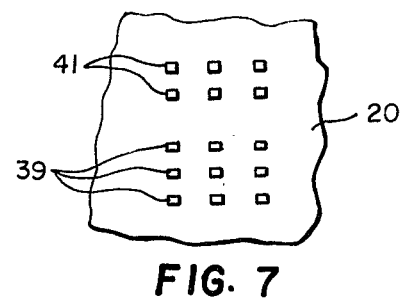

PROTECTIVE CLOSURE FOR INTERNAL PIPE THREADS

This is a continuation of application Ser. No. 694,535, filed June 10, 1976, now abandoned.

BACKGROUND OF THE INVENTION

1. Field of the Invention

This invention relates generally to closures, and more specifically to an improved closure for protecting internal threads of different types such as, for example, Buttress and American Petroleum Institute (API) threads at the end of a pipe, pipe coupling or the like.

2. Description of the Prior Art

It is known in the prior art to provide plastic closures for protecting the internal threads on the end of a pipe or pipe coupling secured to a pipe. Some of such closures are not threaded and are merely pressed or hammered into the openings in the couplings. One disadvantage of such closures is that each closure is designed for a particular type of thread and taper, thereby necessitating a large inventory of different but substantially indistinguishable closures. Another disadvantage is that expansion and contraction differences between the plastic and metal cause the closures to fall off or be knocked out of the pipe couplings since no means are provided other than friction to hold the closures in place. Other closures are provided with inner peripheral threads by which the closures may be screwed into threaded engagement with mating internal complimentary threads in the pipe coupling. Once again, due to the large number of different tapers and threads for any one size diameter pipe or pipe coupling, a large number of closures of varied design are required. For example, a closure for a pipe coupling of one size having an internal Buttress type thread in which the threads are of one diameter (at one distance from the coupling end) and extend to the end of the pipe cannot be used on the same size pipe coupling having an internal API thread in which the threads are of a smaller diameter (at the same distance from the coupling end) and do not extend to the end of the coupling.

It is further known to provide metal closures having outer peripheral threads for engaging the internal Buttress and API type threads. In addition to some of the disadvantages of the prior art plastic closures, such metal closures suffer from the added disadvantage that upon threading the closure into the end of the pipe or pipe coupling, cross threading may occur. Such cross threading may damage the internal threads necessitating retapping or cutting off the damaged end and re-threading it. Another disadvantage of the metal closures is that rusting and corrosion may occur at the interface of the closure and pipe coupling or the parts will freeze together in winter necessitating the services of a welder to remove the rusted on or frozen closure.

SUMMARY OF THE INVENTION

In accordance with a preferred embodiment of the invention, an improved plastic closure is disclosed for protecting the internal threaded end of a pipe or pipe coupling having threads generally referred to as Buttress or API type threads. The closure comprises a tapered sleeve having a rim at one end adapted to butt up against the end of the pipe coupling when mounted thereon. The sleeve has a first peripheral thread portion adjacent the rim for threadingly engaging an internal thread of the aforementioned Buttress type for securing the protective closure to the end of the pipe coupling. The sleeve further has a second peripheral thread portion axially spaced from the first thread portion for frictionally engaging an internal thread of the aforementioned API type for securing the protective closure to the end of the pipe coupling. In a more specific embodiment of the invention, the sleeve is provided with a peripheral recess between the first and second thread portions to receive a corresponding portion of the API type thread. Such recess also makes the portion of the sleeve between the groove and its end opposite the rim more flexible with regard to flexing radially inwardly when the closure is inserted into a pipe coupling having an internal API type thread. Some of the advantages of this plastic internal protective closure are: (1) to eliminate cross threading and damage to internal threads during installation on a pipe coupling, (2) to provide a light closure for shipping and handling, and (3) to reduce inventory by providing one closure for any one size pipe coupling capable of protecting all internal threads of the Buttress or API type. The invention and these and other advantages will become more apparent from the detailed description of the preferred embodiment presented below.

BRIEF DESCRIPTION OF THE DRAWINGS

In the detailed description of the preferred embodiment of the invention presented below, reference is made to the accompanying drawing, in which:

FIG. 1 is a perspective view of a preferred embodiment of the closure of this invention installed on the end of a pipe coupling;

FIG. 2 is an enlarged bottom view of the closure of FIG. 1;

FIG. 3 is a side elevational view of the closure of FIG. 2

FIG. 4 is a section view taken substantially along line 4—4 of FIG. 2;

FIG. 5 is an enlarged segmental view showing the closure installed on a pipe coupling having a Buttress type thread;

FIG. 6 is a view similar to FIG. 5 showing the same closure installed on a pipe end having an API type thread; and FIG. 7 is a segmental view of another embodiment of the helical thread portion of FIG. 3.

DESCRIPTION OF THE PREFERRED EMBODIMENT

With reference to FIGS. 1-7 of the drawing, a preferred embodiment of a protective closure 10 is disclosed for the internal threads at the end of a pipe coupling 12 secured to a pipe 13. For the purposes of the invention, the term "pipe coupling" will be used in the description of the invention and should be interpreted to mean any hollow cylindrical member such as a pipe coupling (for use in coupling pipe ends together), pipe, tube, casing or the like. Although closures 10 are highly useful for protecting the internal threads at the end of couplings used in the petroleum industry where the pipes and couplings are subjected to heavy abuse in handling and shipment, they, of course, could be used to protect the internal threads at the end of any type of pipe or coupling. Although protective closures 10 for protecting internal threads at the end of pipe coupling 12 are generally well known in the art, the primary advantage of the closure of this invention is that one closure can be used to protect the internal threads of many different thread and taper designs for any one size pipe coupling, thereby eliminating the necessity for a specially designed closure for each type of thread design. For example, one common type of pipe coupling thread design is referred to in the industry as the Buttress internal thread 14 (FIG. 5) in which the thread extends to the end of pipe coupling 12. Another common type of thread design is referred to in the industry as the "8 Round" American Petroleum Institute (API) internal thread 16 (FIG. 6) in which the threads terminate a short distance from the end of the pipe coupling, and the coupling section between the ends of threads 16 and coupling 12 is flared or tapered outwardly to form a recess 18. As noted, the coupling wall thickness "x" for the Buttress thread 14 at one distance from the end of coupling 12 is less than the coupling wall thickness "y" for the API thread at the same distance resulting in a smaller internal or inside thread diameter for coupling 12 containing the API thread 16. Such wall thicknesses "x" and "y" are illustrated in exaggerated form for purposes of clarity. Accordingly, the Buttress type thread 14 as referred to hereinafter is exemplary of internal threads of all designs in which the threads extend to the end of the pipe coupling. The API thread 16 as referred to hereinafter is exemplary of all designs of internal threads and taper in which the end of the threads 16 is spaced from the end of the pipe coupling 12, the coupling section between the ends of the threads 16 and coupling 12 is tapered or flared outwardly to form a recess 18, and the internal thread diameter at any selected distance from the end of the coupling is less than the internal thread diameter for the corresponding Buttress type thread 14 at the time distance.

More specifically, with reference to FIGS. 1-7, the protective closure 10 is molded out of any suitable high-impact plastic and comprises a generally tapered sleeve 20 having a rim 22 at one end. The rim 22 has an inner face 24 for engaging the end of a pipe coupling 12 when the closure 10 is mounted on the coupling. The other end 26 of closure 10 may be opened as illustrated in FIGS. 5 and 6 or closed as illustrated in FIG. 4, depending upon the necessity for keeping the coupling opening or cavity free of dirt or the like. If end 26 is closed, a plurality of small openings 28 (FIG. 4) are provided in the end plate for pipe ventilation so that condensation within the pipe is minimized. The rim 22 is provided on its outer face 30 with diametrically opposed slots 32 for receiving a metal bar or the like used to screw or unscrew closure 10 from the pipe coupling. The inner peripheral surface 34 of the sleeve 20 is smooth, and its outer peripheral surface 36 has a first helical thread portion 38 adjacent face 24 of rim 22. Surface 36 further has a plurality of interrupted or circumferentially spaced second helical thread portions 40 interposed between helical thread portion 38 and closure end 26 (opposite closure face 30). The helical thread portions 40 are preferably spaced apart circumferentially to allow moisture within pipe 12 to drain out. Applicant has discovered that two or three helical threads in each of the helical thread portions 38 are sufficient for the purposes of this invention. Helical thread portions 38 are used to screw and unscrew closure 10 from a pipe coupling having a Buttress type thread and thread portions 40 used to screw and unscrew the closure from a pipe coupling having an API thread. Although thread portions 38 are shown interrupted and thread portions 40 continuous, the reverse could be true. Also, a plurality of small studs 39, 41 (FIG. 7) properly arranged on surface 36 and adapted to enter and follow internal threads on pipe coupling 12 could be substituted for thread portions 38, 40 respectively and should be considered the equivalent thereto for the purposes of this invention. Interposed between thread portions 38, 40 is a peripheral recess 42 for receiving or accommodating the complimentary leading thread portion 43 of the API threads 16 when the closure is mounted thereon.

With reference to FIG. 5, a fragmentary section of closure 10 is illustrated showing the closure installed in pipe coupling 12 of a selected outside diameter containing a Buttress type internal thread 14. Since the closure is plastic and hence resilient, it can be installed either by screwing the closure on or pounding it into the coupling without damaging the threads of the coupling or closure. In this application, the first thread portion 38 is in threaded engagement with internal thread 14 and provides a first primary source or means for securing the closure to pipe coupling 12. The second helical portions 40 also engage internal threads 14 to provide a first secondary means for securing the closure to the coupling.

With reference to FIG. 6, the same closure 10 of FIG. 5 is installed on the end of a pipe coupling 12 of the same outside diameter containing an 8 Round API type thread 16. In this application, as closure 10 is threaded or hammered into the coupling, the portion of sleeve 20 between recess 42 and the closure end 26 constitutes a radially flexible end portion and (opposite closure end face 30 which constitutes a substantially radially inflexible end portion) is flexed or bowed radially inwardly in the manner of a spring due to the aforementioned smaller internal thread diameter of thread 16. This results in a highly frictional thread engagement between the second thread portions 40 and internal threads 16 of the coupling to provide a second primary means for securing the closure to the coupling. As closure 10 is fully threaded or hammered into coupling 12, the first thread portion 38 (which has an axial length substantially equal to the axial length of pipe taper recess 18) is forced into the recess and in certain situations may provide a second secondary means for securing the closure to the coupling. As indicated earlier, the peripheral recess 42 between the first and second thread portions 38, 40 receives or accommodates the complimentary leading thread portion 43 of the internal API threads 16.

The invention has been described in detail with particular reference to a preferred embodiment, but it will be understood that variations and modifications can be effected within the spirit and scope of the invention as described.

What is claimed is:

1. A plastic closure for protecting first and second internal threads of different internal diameters at a selected distance from the end of first and second pipe couplings respectively, the second pipe coupling further having a taper recess at its end, the combination comprising:

a hollow sleeve having a substantially radially inflexible end portion and an opposite radially flexible end portion;

a rim at said radially inflexible end portion of said sleeve;

first thread means on the outer periphery of said radially inflexible end portion of said sleeve adjacent said rim for (1) threadedly engaging the first internal thread of the first pipe coupling for providing a first primary means for securing the closure to the first pipe coupling when mounted thereon, and (2) to nest within the taper recess on the second pipe coupling for providing a secondary means, if any, of securing the closure to the second pipe coupling when mounted thereon;

second thread means on the outer periphery of said radially flexible end portion of said sleeve separate and axially spaced from said first thread means and (1) adapted to engage said first internal threads of the first pipe coupling for providing a first secondary means for securing the closure to the first pipe coupling when mounted thereon, and (2) adapted to be flexed radially inwardly by the second internal threads of the second pipe coupling for providing a second primary means for securing the closure to the second pipe coupling when mounted thereon; and a peripheral recess between said first and second thread means for receiving the leading portion of said second internal thread of said second pipe coupling when said radially flexible end portion of said sleeve and said second thread means thereon are flexed radially inwardly.

2. The closure of claim 1 wherein said second thread means comprises helical threads.

3. The closure of claim 1 wherein said second thread means comprises a plurality of spaced apart studs.

4. The closure according to claim 1 wherein said sleeve is tapered, and said second thread means comprises a plurality of interrupted helical threads.

5. The closure of claim 1 wherein said radially flexible end portion of said sleeve is closed.

6. The closure of claim 1 wherein said rim is provided with at least one pair of oppositely positioned slots by which the closure can be screwed into or out of said pipe end.

7. A plastic closure for protecting first internal threads of a first pipe coupling in which the first threads extend to the end of the first pipe coupling and have one diameter at one distance from the end of the first coupling, and second internal threads of a second pipe coupling in which the second threads terminate at a point short of the end of the second pipe coupling, and the coupling section from said point to the end of the second coupling is flared outwardly to form a recess, and the second threads have a diameter smaller than the one diameter at said one distance from the end of the second coupling comprising:

a hollow sleeve having a substantially radially inflexible end portion and an opposite radially flexible end portion;

a rim at said radially inflexible end portion of said sleeve;

first outer peripheral helical thread means on said radially inflexible end portion of said sleeve adjacent said rim for (1) threadingly engaging the first internal threads for providing a first primary means for securing the closure to the first pipe coupling, and (2) for nesting within the recess for providing a second secondary means, if any, for securing the closure to the second pipe coupling; and second outer peripheral thread means on said radially flexible end portion of said sleeve separate and axially spaced from said first thread means, said second thread means adapted (1) to frictionally threadedly engage said first internal threads of the first pipe coupling for providing a first secondary means for securing the closure to the first pipe coupling, and (2) to be flexed radially inwardly by the second internal threads of the second pipe coupling and to frictionally threadedly engage said second internal threads to provide a second primary means for securing the closure to the second pipe coupling.

8. The closure of claim 7 wherein said sleeve is tapered and provided with a peripheral recess between said first and second thread means to allow said flexible end portion and second thread means thereon to flex radially inwardly for accommodating the leading internal threads of the second pipe coupling when the closure is inserted into the second pipe coupling.

* * * * *